United States Patent
Nystuen

[15] 3,680,070
[45] July 25, 1972

[54] ELECTRONIC CONTROL MEANS FOR DISPENSING APPARATUS

[72] Inventor: Marcus I. Nystuen, St. Paul, Minn.
[73] Assignee: Economics Laboratory, Inc., St. Paul, Minn.
[22] Filed: May 25, 1970
[21] Appl. No.: 40,206

[52] U.S. Cl. .................340/244, 137/88, 307/252 N, 307/252 B
[51] Int. Cl. ...................................................G08b 21/00
[58] Field of Search .................340/236, 244; 137/88, 93; 307/318, 252 N, 252 B; 328/165; 315/351, 352, 354

[56] References Cited

UNITED STATES PATENTS

| | | | |
|---|---|---|---|
| 3,263,224 | 7/1966 | Berman et al. | 340/236 |
| 3,177,377 | 4/1965 | Brown | 328/165 |
| 3,331,992 | 7/1967 | Walker | 307/318 |
| 2,715,722 | 8/1955 | Relis | 340/236 |
| 2,656,526 | 10/1953 | MacKay | 340/236 |
| 2,525,016 | 10/1950 | Borell | 340/236 |
| 3,131,346 | 4/1964 | Parke | 340/236 |

Primary Examiner—Thomas B. Habecker
Attorney—Merchant & Gould

[57] ABSTRACT

An electrical bridge circuit having a conductivity cell in one leg thereof, normally biased away from the null point so that a signal is produced by the bridge when the conductivity cell is operating at a desired set point. A semiconductor switching circuit is attached to a solenoid valve to vary material added to a solution, such as soap mixed with water. A combination of switching circuit bias, the signal from the bridge and a signal platform produced by a zener diode during portions of the positive cycle of an alternating power source, normally maintain the switch in a non-conducting state but sufficient variation of the conductivity cell in a direction caused by low conductivity, or too little material in the solution, produces a sufficient signal to switch the semiconductor switch into a conducting state to operate the solenoid valve.

9 Claims, 2 Drawing Figures

INVENTOR.
MARCUS I. NYSTUEN
BY
Merchant & Gould
ATTORNEYS

ELECTRONIC CONTROL MEANS FOR DISPENSING APPARATUS

BACKGROUND OF THE INVENTION

1. Field of the Invention

In many types of material dispensing devices, such as apparatus for dispensing soap in water for dishwashers and the like, it is desirable to maintain the final mixture at a desired consistency. To preform this task the apparatus must include a sensor which monitors a particular condition of the mixture, such as conductivity, heat, weight, etc., and controls a valve or the like, which in turn controls at least one of the components in the mixture. In the example of the dishwasher, a conductivity cell normally monitors the amount of soap in the water and, when the soap falls below a desired level, the conductivity cell produces a signal which opens a valve to add more soap to the water.

2. Description of the Prior Art

In the prior art, conductivity cells are utilized to control switching circuits, which in turn control solenoid valves or the like to feed material into a mixture. Generally these control devices are connected to an alternating source of electrical power and the units are highly susceptible to hunting (operating the solenoid valve at a relatively high rate) when the mixture is close to the desired consistency. Further, transients in the power supply have a tendency to cause the unit to inadvertently operate and changes in the power supply voltage greatly effect the set point at which the unit operates.

SUMMARY OF THE INVENTION

The present invention pertains to electronic control means including condition responsive means for sensing variations in a predetermined condition and switching means normally biased into a first state with platform producing means for providing an electrical signal of a predetermined level at specifically determined periods and means for summing the output of the condition responsive means and platform producing means to cause the switching means to switch only when the condition responsive means produces a signal of a predetermined amplitude in a desired direction.

It is an object of the present invention to provide new and improved electronic control means for use with dispensing apparatus and the like.

It is a further object of the present invention to provide improved control means constructed to greatly reduce hunting and inadvertent operation caused by transients and the like.

It is a further object of the present invention to provide improved control means which are less susceptible to variations in power supply voltage.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

Figure 1:
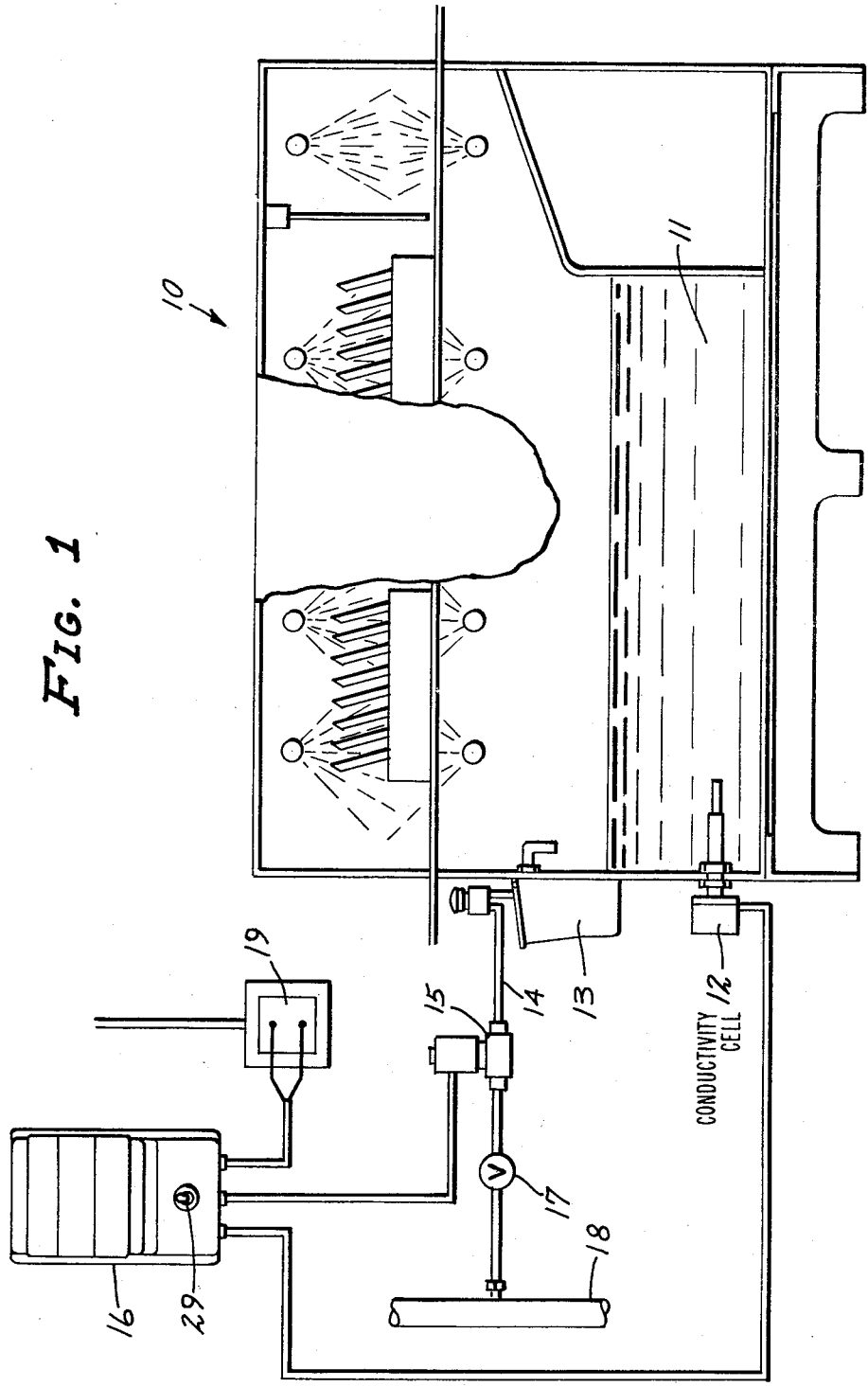
FIG. 1 is a diagrammatic view of a dishwashing unit having the present electronic control means operatively attached thereto.

DESCRIPTION OF THE PREFERRED EMBODIMENT in the figures the numeral 10 generally designates a dishwasher having a solution tank 11 at the bottom thereof with a conductivity cell 12 affixed in one wall so that the sensing portion thereof is positioned within a solution in the solution tank 11. A reservoir 13 positioned externally on a side wall generally above the level of the solution in the tank 11 contains a saturated solution of some material, such as a detergent or the like, and a water line 14 conducts water to the reservoir 13, when desired, to cause the reservoir 13 to overflow into the solution tank 11 and raise the concentration of the detergent solution in the tank 11. A solenoid valve 15 is connected to mechanically control the flow of water in the water line 14 and is electrically connected to a control unit 16. The water line 14 further has a manual type control valve 17 which controls the flow of water in the line 14 for purposes of maintenance, etc. The water line 14 is connected to a water supply line 18, which is in turn connected to a source of water (not shown). The control unit 16 is connected to a suitable source of power, such as 115 Volts AC, through a transformer 19. The transformer 19 reduces the voltage applied to the control unit 16 to some suitable amplitude, such as 20 Volts AC. It should be understood that the application of the control apparatus, illustrated in FIG. 1, is simply utilized for explanatory purposes and many other applications for the control unit 16 with or without the conductivity cell 12 or some similar type of condition responsive means and with or without the solenoid valve 15, may be devised by those skilled in the art.

Figure 2:
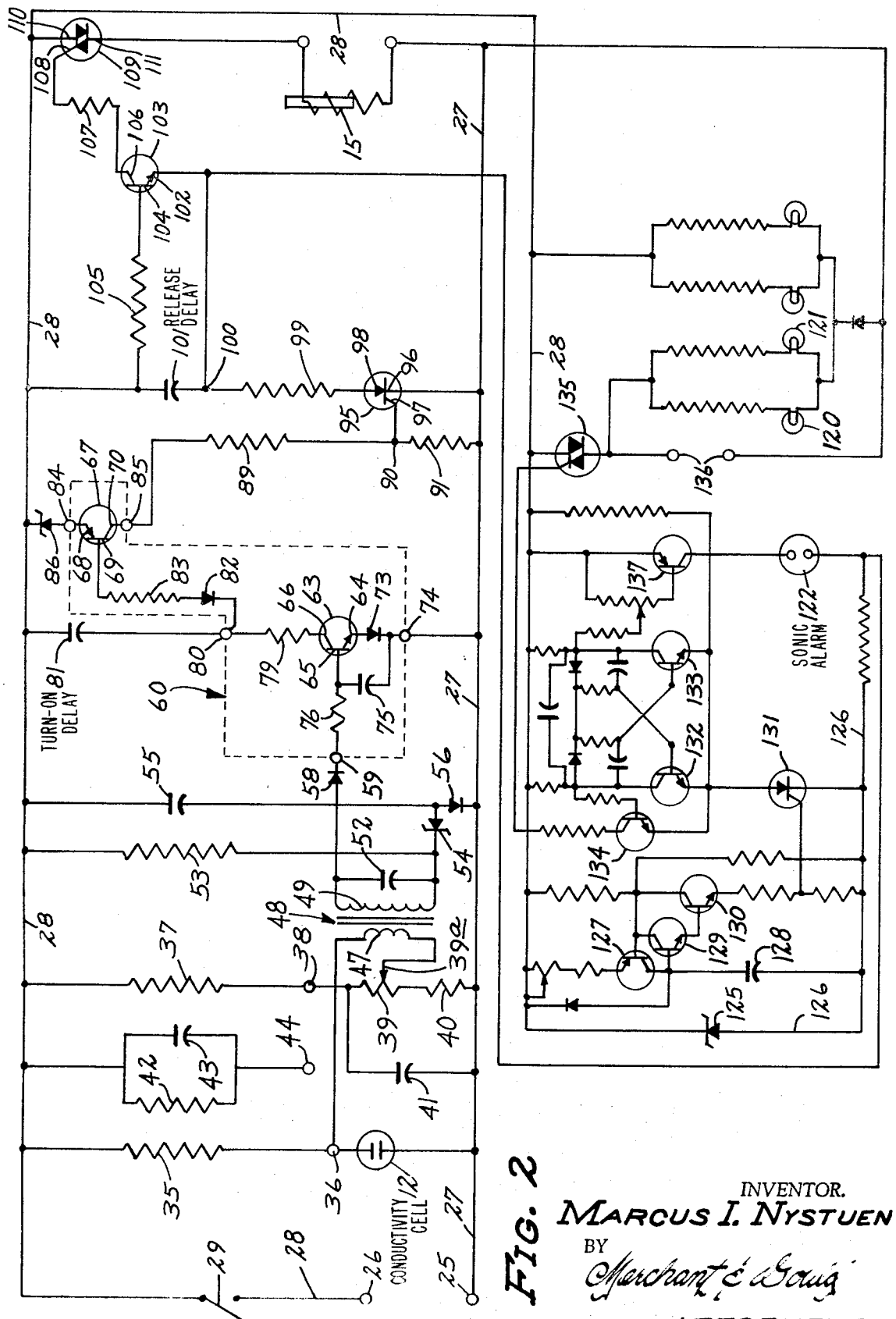
FIG. 2 is a schematic view of the present electronic control means.

Referring more specifically to FIG. 2, the control unit 16, operatively connected to the conductivity cell 12 and the solenoid 15 is illustrated schematically. The control unit includes a pair of input terminals 25 and 26 having lines 27 and 28 connected thereto, respectively. The line 28 is connected to the terminal 26 through an off-on switch 29. The terminals 25 and 26 are adapted to be connected to a suitable source of power, such as 20 Volts AC supplied by the transformer 19. The lines 27 and 28 are in effect buss-type power lines which supply power to the remainder of the circuitry.

One lead of a resistor 35 is connected to a terminal 36 and the opposite lead is connected to the line 28. One lead of the conductivity cell 12 is connected to the terminal 36 and the opposite lead is connected to the line 27. A second resistor 37 is connected between the line 28 and a second terminal 38 and the terminal 38 is connected through the stationary leads of a potentiometer 39 and a resistor 40 to the line 27. Resistors 35, 37 and 40, conductivity cell 12 and potentiometer 39 form an electrical bridge circuit with the terminal 36 and the movable contact of the potentiometer 39, designated 39a, forming the output terminals. A capacitor 41 is connected in parallel with the potentiometer 39 and resistor 40 between the terminal 38 and the line 27 to offset the capacitive reactance of the conductivity cell 12. An alternate range is supplied for the bridge circuit by providing a parallel connection of a resistor 42 and a capacitor 43 connected between the line 28 and a terminal 44, which terminal 44 may be connected to the terminal 36. The bridge circuit is normally constructed or biased so that the terminal 36 is negative relative to the movable contact 39a and the setting of the movable contact a adetermines the normal or the set point about which the conductivity cell 12 will vary. Thus, the movable contact 39a is a concentration adjustment for the control unit 16 to determine the concentration of the solution in the solution tank 11.

A primary winding 47 of a transformer, generally designated 48, is connected between the terminal 36 and the movable contact 39a to receive the output signals from the bridge circuit and induce them in a secondary winding 49 of the transformer 48. The transformer 48 has a step-up ratio of approximately one to ten between the primary winding 47 and the secondary winding 49 so that it furnishes some amplification for the output signal of the bridge circuit as well as isolating the bridge circuit from the remainder of the circuitry. The transformer 48 is wound so that (during positive half-cycles) the upper end thereof (in FIG. 2) is normally negative and the lower end thereof is normally positive. A capacitor 52 is connected across the secondary winding 49 to aid in removing any transients from the signal induced into the secondary winding 49. The lower end of the secondary winding 49 is connected through a resistor 53 to the line 28 and to the cathode of a zener diode 54. The anode of the zener diode 54 is connected through a relatively large filter capacitor 55 to the line 28 and to the anode of a semiconductor diode 56, the cathode of which is connected to the line 27. The resistor 53, zener diode 54 and semiconductor diode 56 form a voltage divider circuit between the lines 27 and 28 which maintains the lower end of the secondary winding 49 positive relative to the line 27 during the positive half-cycles of the voltage applied to the terminals 25 and 26. The upper end of the secondary winding 49 is connected to the anode of a semiconductor diode 58, the cathode of which is connected to a terminal 59 in an encapsulated switching circuit, generally designated 60. The switching circuit 60 is encapsulated to reduce the effects of humidity and the like and it should be understood that encapsulation is not required.

The encapsulated switching circuit 60 contains an N-P-N type transistor 63, having an emitter 64, a base 65 and a collector 66, and an P-N-P type transistor 67, having an emitter 68, a base 69 and a collector 70. The emitter 64 of the transistor 63 is connected to the anode of a diode 73, the cathode of which is connected to a terminal 74 of the switching circuit 60 and directly therethrough to the line 27. The terminal 74 is also connected through a protective-type capacitor 75 to the base 65 of the transistor 63, which is also connected through a current limiting resistor 76 to the terminal 59 of the switching circuit 60. The collector 66 of the transistor 63 is connected through a resistor 79 to a terminal 80 of the switching circuit 60, which is connected through a relatively large capacitor 81 to the line 28. The capacitor 81 and resistor 79 form a delay or integrating circuit which delays the appearance of a signal on the terminal 80 once the transistor 63 is triggered into conduction. The terminal 80 is connected to the cathode of a semiconductor diode 82, the anode of which is connected through a resistor 83 to the base 69 of the transistor 67. The emitter 68 of the transistor 67 is connected to a terminal 84 and the collector 70 is connected to a terminal 85 of the switching circuit 60. The terminal 84 is connected to the anode of a zener diode 86, the cathode of which is connected to the line 28, and the terminal 85 is connected to one lead of a resistor 89. The opposite lead of the resistor 89 is connected to a junction 90, which is connected through a resistor 91 to the line 27. It should be understood that the switching circuit 60 is simply illustrated for explanatory purposes and a great variety of modifications and innovations might be made thereto.

An SCR (silicon controlled rectifier) 95 has a cathode 96 connected directly to the line 27 and a gate 97 connected directly to the junction 90 between the resistors 89 and 91. An anode 98 of the SCR 95 is connected to one end of a resistor 99, the other end of which is connected to a junction 100. The junction 100 is connected through a relatively large storage capacitor 101 to the line 28. The junction 100 is also connected to an emitter 102 of an N-P-N type transistor 103. A base 104 of the transistor 103 is connected through a resistor 105 to the line 28. A collector 106 of the transistor 103 is connected through a resistor 107 to a gate 108 of a triac 109. A number one main terminal 110 of the triac 109 is connected directly to the line 28 and a number two main terminal 111 of the triac 109 is connected through the winding of the solenoid valve 15 to the line 27. The SCR 95, transistor 103 and triac 109 form a portion of the switching circuit, although they are not encapsulated with the portion of the switching circuit 60, and it should be understood that variations and modifications thereof may be provided by those skilled in the art.

Typical examples of component values for control apparatus utilizing a 20 Volt AC power source are listed below.

| Component | | Value |
|---|---|---|
| Resistor | 35 | 1 K Ohms |
| | 37 | 1.5 K |
| | 39 | 200 |
| | 40 | 150 |
| | 42 | 820 |
| | 53 | 100 K |
| | 76 | 100 K |
| | 79 | 1.2 K |
| | 83 | 22 K |
| | 89 | 10 K |
| | 91 | 1 K |
| | 99 | 27 |
| | 105 | 27 K |
| | 107 | 330 |
| Capacitor | 41 | 1 Microfarads |
| | 43 | 0.5 |
| | 52 | 0.1 |
| | 55 | 4 |
| | 75 | 0.005 |
| | 81 | 4 |
| | 101 | 200 |
| | 128 | 100 |
| Zener Diode | 54 | 10 Volts |
| | 86 | 5.1 |
| | 125 | 18 |
| Transistors 63, 106, 129, 130 132, 133, 134 | | ZN5172 |
| 67, 127, 137 | | ZN4402 |
| SCRs 95,131 | | ZN5061 |
| Triacs | | 40668 |

In the operation of the circuitry described above, the bridge circuit is biased so that a voltage is induced into the secondary winding 49 of the transformer 48 such that the upper end thereof is negative relative to the bottom end thereof, as previously described. Since the remainder of the circuitry only operates when the terminal 26 is positive relative to the terminal 25 (the positive half-cycles of the 20 Volts AC), the operation of the circuitry will be considered with the line 28 positive relative to the line 27 and it should be understood that all of the described circuitry will be in a non-conducting state when the line 28 is negative relative to the line 27. In view of the above-described conditions, the conductivity cell 12 appears as a variable resistance with the value thereof decreasing as the concentration of the solution in tank 11 increases and the value thereof increasing as the concentration of the solution decreases. Because a decrease in the resistance value of the conductivity cell 12 indicates an increase in concentration of the solution above the desired amount or set point, it is important that the upper end of the secondary winding 49 of the transformer 48 increase in negative value to maintain the transistor 63 in a non-conducting state. Because an alternating current power source is being utilized to energize the present circuitry, many harmonics and reactive components are prevalent in the bridge circuit and coupling circuit therefrom so that in many instances the resistive value of the conductivity cell 12 can be below the set point, indicating too great a concentration in the solution, and a signal can be applied to the switching circuit 60 which would tend to cause the switching circuit 60 to conduct. The present circuit is designed to rectify this possible discrepancy.

The voltage across the secondary winding 49, the diode 58, the resistor 76 and the base 65-emitter 64 junction of the transistor 63 (which is normally well below that required to produce conduction in the transistor 63) add to counteract the voltage produced across the zener diode 54. The diodes 56 and 73 are positioned oppositely in the circuit so that they offset each other and need not be considered. Because of the normal operating characteristics of the zener diode 54, as the positive voltage on the line 28 increases sinusoidally the voltage across the zener diode 54 increases to a maximum level (approximately 10 Volts in this embodiment) and, therefore, forms a platform, during a small portion of the positive half of the wave form, which biasing platform tends to offset the signal at the transistor 63, produced by the induced signal in the secondary winding 49, the diode 58 and the resistor 76. As the signal voltage across the secondary winding 49 becomes less negative, or more positive, due to a reduction in concentration of the solution sensed by the conductivity cell 12, the sum of the voltages providing the bias between the base 65 and emitter 64 of the transistor 63 increases to a value sufficient to produce conduction in the transistor 63. Because the platform produced by the zener diode 54 is only prevalent during a short portion of the positive half-cycle of alternating supply voltage, out of phase signals which tend to lag or lead the supply voltage and cause triggering of the transistor during the beginning or end portions of the positive half-cycles of the supply voltage are eliminated and cannot effect the transistor 63. Further, only transients that occur during the time the platform produced by the zener diode 54 is present can affect the transistor 63 and, therefore, substantial numbers of transients are eliminated. In addition to providing the above advantages, the present biasing system does not effect the sensitivity of the circuit because the transformer 48 is constructed with a one-to-10 step-up ratio so that a one volt change in the voltage between the terminal 36 and the movable contact 39a produces a 10 volt change across the secondary winding 49.

Upon a sufficient change in the biasing circuit of the transistor 63 to produce a change of state, in this embodiment to produce conduction, charging current begins to flow into the capacitor 81 with the voltage across the capacitor 81 being initially zero and the voltage across the resistor 79 being initially approximately the same as the voltage between the lines 27 and 28. If the transistor 63 continues in the conduction state long enough, the capacitor 81 charges to approximately the full value so that the voltage at the junction 80 is reduced to a value approximately equal to the voltage on line 27. When the terminal 80 drops to this value the transistor 67 is biased into a conducting state and current flows through the zener diode 86, the transistor 67, the resistor 89 and the resistor 91. Thus, the capacitor 81 and the resistor 79, which form electrical storage means or an integrating circuit, operate to delay the change of state of the transistor 67 until the transistor 63 has been in a conduction state for a predetermined period of time, which in this embodiment is between 10 and 50 milliseconds, so that transients normally do not operate to trigger the circuit and only a low concentration signal from the conductivity cell 12 will generally cause the circuit to operate.

With current flowing through the resistor 91, as described above, there is sufficient current at the junction 90 to flow into the gate 97 of the SCR 95 and produce conduction thereof. Once the SCR 95 begins to conduct, it conducts until the capacitor 101 charges sufficiently to forward bias the transistor 103 and produce conduction thereof. Gate current is then free to flow in the triac 109 and this device continues to conduct through both the positive and negative half-cycles of the voltage supply until the preceeding switching circuitry is triggered into a non-conducting state and the capacitor 101 is discharged. The capacitor 101 is of a substantially large size so that it continues to supply gate current to the triac 109 through at least one complete cycle. Thus, the capacitor 101 is an electrical storage device which delays the turning off of the circuit until at least one complete cycle is completed so that hunting and the like are eliminated from the operation. It should be understood that other electrical storage devices or circuits other than those disclosed might be utilized by those skilled in the art to perform the functions set forth herein and the disclosed embodiment is simply for explanatory purposes.

The lower portion of the circuitry illustrated in FIG. 2 pertains to an alarm system which is actuated if the switching circuitry described above remains in a conducting state for a predetermined period of time. When the switching circuitry remains in a conducting state too long, this is an indication that the supply of concentrated material being added to the solution tank 11 from the reservoir 13 is not sufficient to bring the concentration within the tank 11 to the normal or standard amount and operator assistance is required. A pair of lightbulbs 120 and 121 and a sonic alarm 122 are provided to produce an alarm when this condition occurs. The operation of the alarm circuitry will be discussed briefly because the major portion of the circuits are well understood by those skilled in the art and need not be described in detail.

A zener diode 125 is connected between a line 28 (which is an extension of the line 28 described as the positive line in conjunction with the previous circuitry) and a line 126, which is connected to the emitter 102 of transistor 103 and to junction 100. The zener diode 125 operates as a power supply to provide a predetermined voltage (in this instance 18 Volts) between the line 28 and the line 126. A first transistor 127 and a large capacitor 128 are connected between the lines 28 and 126 to operate as a timing circuit. When the triggering circuit previously described has been in a conducting state sufficiently long to charge the capacitor 101, the emitter 102 of the transistor 103 drops to a value near the voltage of the line 27 and, consequently, the line 126 is at the same value.

Since the line 126 has a low voltage relative to the line 28, the transistor 127 conducts until the capacitor 128 has charged to a value near the difference between the two lines. When the charge on the capacitor 128 reaches a predetermined value, a pair of transistors 129 and 130 (connected as a Darlington pair) begin to conduct and provide gate current for an SCR 131. Once the SCR 131 begins to conduct, a pair of transistors 132 and 133, forming a flip-flop type vibrator, are provided with sufficient electrical energization to begin to alternately conduct. When the transistor 132 is non-conducting, a transistor 134, operatively attached thereto, is biased into a conducting state and supplies gate current to a triac 135, which begins to conduct and energize the lightbulbs 120 and 121. A pair of terminals 136 are connected in parallel with the lightbulbs 120 and 121 and their associated circuitry, and are adapted to have external warning devices attached thereto. When the transistor 133 is in a conducting state, a transistor 137, operatively attached thereto, is biased into a conducting state and supplies energization to the sonic alarm 122. Thus, when the transistor 103 remains in a conducting state for a sufficiently long time to cause the capacitor 128 to charge through the transistor 127 the lightbulbs 120 and 121 and the sonic alarm 122, as well as any external warning devices attached to the terminals 136, are energized to indicate operating difficulty.

Thus, control apparatus is disclosed which operates upon the reception of a signal from a condition responsive means. The control apparatus is constructed so that it is sensitive to the desired or in phase signal from the condition responsive means and so that it rejects the undesirable or out of phase signals from the condition responsive means. Further, the control apparatus is constructed to reject transients and other undesirable signals and to operate with improved regulation, i.e., less change in the set point and other operating characteristics during fluctuations of power supply voltage.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. Electronic control means comprising:
   a. switching means switchable between a first state and a second state upon the application thereto of a signal having a predetermined voltage;
   b. biasing means for providing a clipped alternating signal having a voltage level during the clipped portion thereof greater than the predetermined signal voltage required to cause said switching means to change states;
   c. condition responsive bridge means for sensing variations in a predetermined condition about a normal value and providing an alternating output signal varying about an off-null set point in response to variations in the predetermined condition, the output signal being in a direction and normally of sufficient magnitude to overcome the signal produced by said biasing means;
   d. summing means connecting the condition responsive means and the biasing means to said switching means for summing the output signal and the clipped alternating voltage signal to cause said switching means to change states whenever the sum thereof exceeds the predetermined signal voltage.

2. Electronic control means as set forth in claim 1 wherein the condition responsive means includes a conductivity sensor connected in one leg of an electrical bridge circuit.

3. Electronic control means as set forth in claim 2 wherein the bridge circuit has a null point and is biased so as to operate in a substantially unbalanced condition entirely on one side of said null point.

4. Electronic control means as set forth in claim 1 wherein the biasing means includes a zener diode electrically connected to a source of alternating electrical power for clipping the alternating signal provided by the power source to provide said clipped biasing signal.

5. Electronic control means as set forth in claim 1 wherein the switching means includes a semi-conductor device electrically connected to a source of alternating electrical power.

6. Electronic control means as set forth in claim 1 having in addition electrical storage means connected to the switching means for delaying the switching thereof from the first state to the second state until the signal applied thereto has a predetermined duration as well as the predetermined level.

7. Electronic control means as set forth in claim 1 having in addition electrical storage means connected to the switching means for maintaining the switching means in the second state a predetermined time after the switching thereof and the removal of the signal producing the switching.

8. Electronic control means as set forth in claim 7 having in addition alarm circuitry means electrically connected to the switching means and including a timing circuit for triggering an alarm indication upon the switching means remaining in the second state at least a predetermined time.

9. Electronic control means as set forth in claim 1 having in addition solenoid controlled valve means electrically connected to the switching means for controlling the flow of a material in a conduit of dispensing apparatus.

* * * * *